No. 619,739. Patented Feb. 21, 1899.
B. F. EMERY.
CHURN.
(Application filed May 16, 1898.)
(No Model.)
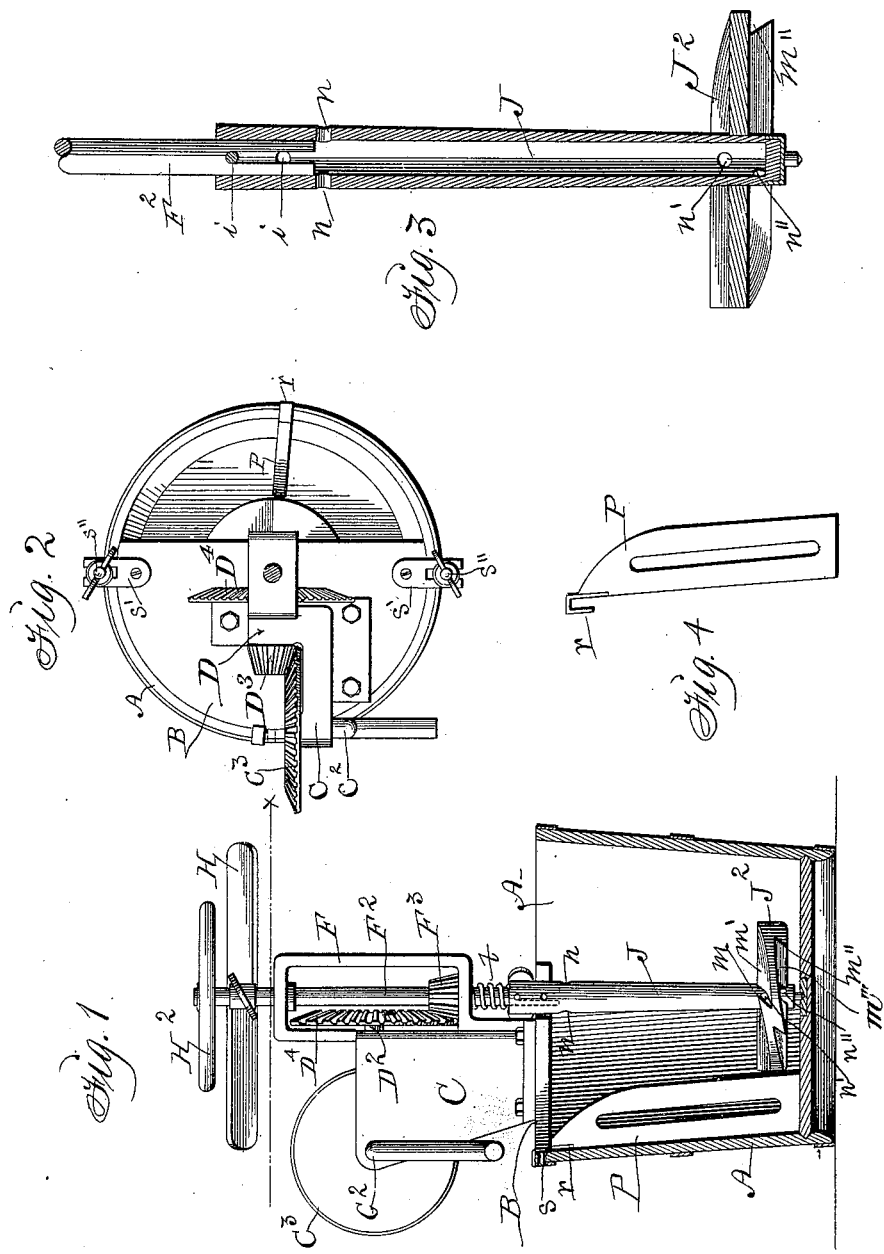

UNITED STATES PATENT OFFICE.

BENJIMAN F. EMERY, OF DES MOINES, IOWA.

CHURN.

SPECIFICATION forming part of Letters Patent No. 619,739, dated February 21, 1899.

Application filed May 16, 1898. Serial No. 680,896. (No model.)

*To all whom it may concern:*

Be it known that I, BENJIMAN F. EMERY, a citizen of the United States, residing at Des Moines, in the county of Polk and State of Iowa, have invented a new and useful Dasher-Churn, of which the following is a specification.

My object is to facilitate the labor of churning butter by means of the simultaneous action of centrifugal and centripetal forces as a means of agitating and aerating milk to separate the cream therefrom and to produce butter.

My invention consists in the dasher-churn hereinafter set forth, pointed out in my claims, and illustrated in the accompanying drawings, in which—

Figure 1 is a vertical sectional view of a churn-vessel, showing my dasher and operative mechanism combined therewith as required for practical use. Fig. 2 is a top view of the churn, looking down from the line $x\,x$ in Fig. 1. Fig. 3 is an enlarged sectional view of the dasher-wheel and tubular air-conducting shaft and a section of a detachable shaft detachably connected with the top of the tubular shaft. Fig. 4 is a view of one of a series of current-breakers adapted to be detachably connected with the churn vessel.

The letter A designates an open-topped churn vessel adapted to retain milk.

B is a wooden base and support for gearing adapted to be detachably fastened on top of the vessel.

C is a metal bracket fixed on top of the base B to support a driving-shaft $C^2$ and a miter gear-wheel $C^3$, fixed to said shaft.

D is an integral right-angled extension of the bracket C, adapted to support a shaft $D^2$, to which is fixed, at one end thereof, a pinion $D^3$ to engage the wheel $C^3$ and to the other end a miter gear-wheel $D^4$.

F is a metal bearer fixed to the base B to support a rotatable shaft $F^2$, and $F^3$ is a pinion fixed to said shaft to engage the miter gear-wheel $D^4$ on the shaft $D^2$.

H is a fan fixed to the top portion of the shaft $F^2$ to aid in keeping the milk in the churn and also the operator cool and to keep off flies, and $H^2$ is a fly-wheel fixed to the top of the same shaft.

J is the tubular shaft of the dasher. It has fixed pins $i\,i$ in its top portion, that are engaged by the branches of the bifurcated lower end of the shaft $F^2$ as required to be rotated therewith.

$J^2$ is a dasher of circular form. It has shoulders $m$ on its top surface, that extend radially from its center, and concave or spiral shaped surfaces $m'$, that extend from the top of one shoulder to the bottom of the other. The shoulders are preferably inclined, as shown. The bottom face has corresponding shoulders $m''$ and spiral-faced concaves $m'''$, that extend in reverse ways from the shoulders and concaves on the top face.

Vents $n$ at the top portion of the tubular shaft admit air, and vents $n'$ in the shaft intersecting the concaves in the top of the circular dasher $J^2$ allow air to pass outward through said concaves to aid in forcing milk from the center to the circumference at the same time that the vents $n''$ in the shaft intersecting the concaves in the under side of the dasher allow air to pass inward to aid in drawing milk from the circumference to the center.

The bottom end of the tubular shaft has a pivot that enters a fixed step in the bottom and center of the vessel A.

P is one of a series of breakers provided with a longitudinal slot, and a hook $r$ at its top end is adapted for detachably connecting it with the vessel A, as shown in Fig. 1, to aid in agitating milk and preventing milk from rising upward above the top of the vessel.

A dowel-pin $s$ on the edge of the base B enters a perforation in the vessel A, and bifurcated metal plates $s'$, fixed on top of the base, admit screws $s''$, that are fixed to the outside face of the vessel in such a manner that by means of winged nuts on the screws the base B can be readily detachably fastened on top of the vessel.

A coil-spring $t$, placed on the shaft $F^2$, aids in keeping the tubular shaft J in connection with the step in the bottom of the vessel.

In the practical operation of my invention when there is milk in the vessel and the shaft $C^2$ is rotated continuous rotary motion and increased speed will be imparted to the tubular shaft J and dasher $J^2$ by means of the intermediate gearing, and air will be drawn in through the vents $n$ and discharged into the milk through the vents $n'$, and the milk on top of the dasher will be subjected to centrifugal force by the form of the top face of the dasher and an outward current established. At the same time milk under the dasher will be subjected to centripetal force by the form of the under surface of the dasher and sucked into the tubular shaft through the vents $n''$ by the air-currents passing outward through the upper series of vents $n'$ to be subject to the currents of air that pass outward over the top of the disk and to unite with said air-currents and the centrifugal force of the top of the disk, and thus a violent agitation and circulation of milk will be produced by the counter-currents to aerate and churn the milk advantageously, as required, to rapidly produce good butter.

I am aware dashers have been simultaneously rotated in reverse ways in churns to produce counter-currents; but in no instance has a single circular dasher been provided with a plurality of radial concaves and shoulders on its top side and corresponding radial concaves and shoulders in its under side and fixed to a tubular shaft having vents intersecting the concaves on the upper side and also provided with vents in a lower plane to intersect the concaves in the under side to operate in the manner set forth.

I claim as my invention—

1. A churn-dasher consisting of a tubular shaft adapted to admit air at its top, a circular dasher-disk having a plurality of radial concaves and shoulders on its top surface and vents in the shaft intersecting said concaves and corresponding concaves and shoulders on its under side and vents in the shaft intersecting said concaves to operate in the manner set forth for the purposes stated.

2. A churn-dasher consisting of a tubular shaft adapted to admit air at its top, a circular dasher-disk having a plurality of radial concaves and shoulders on its top surface and vents in the shaft intersecting said concaves and corresponding concaves and shoulders on its under side and vents in the shaft intersecting said concaves, in combination with an open-topped vessel and means to rotate the shaft and dasher to agitate and aerate milk for the purposes stated.

BENJIMAN F. EMERY.

Witnesses:
 JAS. BARELS,
 THOMAS G. ORWIG.